(12) United States Patent
Kramer et al.

(10) Patent No.: US 10,630,061 B2
(45) Date of Patent: Apr. 21, 2020

(54) METHOD FOR DETERMINING A PROPERTY OF A FLUID COMPONENT OF A FLUID PRESENT IN A COMPARTMENT OF AN ELECTRICAL APPARATUS

(71) Applicant: ABB Schweiz AG, Baden (CH)

(72) Inventors: Axel Kramer, Wettingen (CH); Thomas Alfred Paul, Wädenswil (CH)

(73) Assignee: ABB Schweiz AG, Baden (CH)

( * ) Notice: Subject to any disclaimer, the term of this patent is extended or adjusted under 35 U.S.C. 154(b) by 516 days.

(21) Appl. No.: 15/650,376

(22) Filed: Jul. 14, 2017

(65) Prior Publication Data

US 2017/0317475 A1    Nov. 2, 2017

Related U.S. Application Data

(63) Continuation of application No. PCT/EP2015/050527, filed on Jan. 14, 2015.

(51) Int. Cl.
*G01N 21/3504* (2014.01)
*H02B 13/055* (2006.01)
(Continued)

(52) U.S. Cl.
CPC .......... *H02B 13/055* (2013.01); *G01N 21/33* (2013.01); *G01N 21/3504* (2013.01);
(Continued)

(58) Field of Classification Search
CPC .. H02B 13/055; H02B 13/0655; G01N 21/33; G01N 21/85; G01N 21/3504;
(Continued)

(56) References Cited

U.S. PATENT DOCUMENTS 5,822,058 A * 10/1998 Adler-Golden ...... G01N 21/359
356/303
6,526,805 B1    3/2003 Babes-Dornea et al.
2006/0092423 A1* 5/2006 Servaites ............. G01N 21/359
356/437

FOREIGN PATENT DOCUMENTS

CN        101498754 A        8/2009
CN        104204792 A        12/2014
(Continued)

OTHER PUBLICATIONS

Search Report issued in Chinese Application No. 201580077820.3 dated Jul. 14, 2019 (2 pages).
(Continued)

*Primary Examiner* — Xin Y Zhong
(74) *Attorney, Agent, or Firm* — Taft Stettinius & Hollister LLP; J. Bruce Schelkopf

(57) ABSTRACT

The application relates to a method for determining a property of a fluid component of a fluid present in a compartment of an electrical apparatus by means of a measurement device arranged outside the compartment and comprising a chamber for receiving a quantity of the fluid from the compartment. Amongst other steps of the method, an optical path in the chamber is illuminated by a light source and a first intensity of light is measured by a light detector. Then fluid is released from the compartment into the chamber and a second intensity (Ix) of light is measured. Based on these measurements the property of the fluid component is determined.

37 Claims, 5 Drawing Sheets

Figure 1:
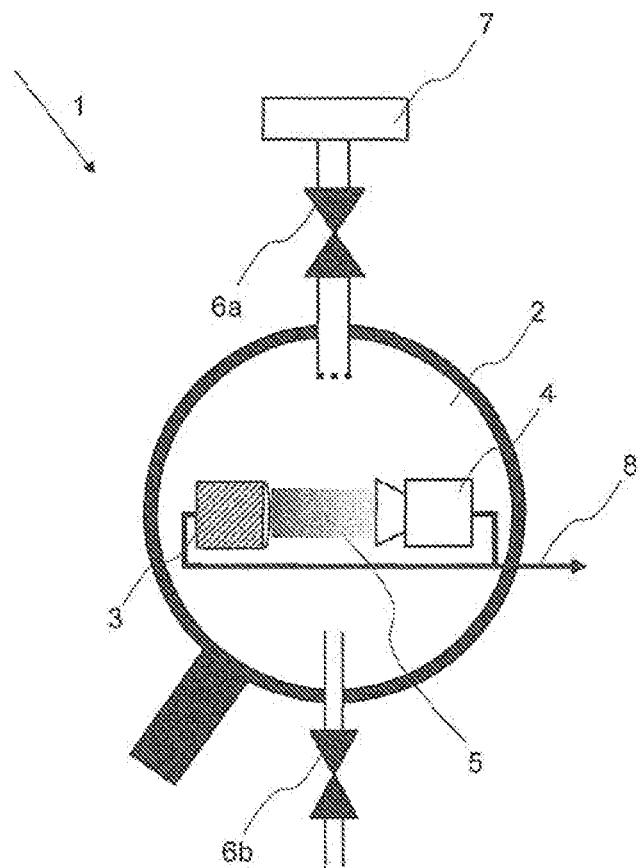

(51) Int. Cl.
*G01N 21/33* (2006.01)
*G01N 21/85* (2006.01)
*H01H 33/56* (2006.01)
*H02B 13/065* (2006.01)
*G01N 21/17* (2006.01)

(52) U.S. Cl.
CPC ........... *G01N 21/85* (2013.01); *H01H 33/563* (2013.01); *G01N 2021/1723* (2013.01); *G01N 2201/0221* (2013.01); *G01N 2201/062* (2013.01); *H01H 2033/566* (2013.01); *H02B 13/0655* (2013.01)

(58) Field of Classification Search
CPC ..... G01N 2201/062; G01N 2201/0221; G01N 2021/1723; G01N 2021/354; H01H 33/563; H01H 2033/566
See application file for complete search history.

(56) References Cited

FOREIGN PATENT DOCUMENTS

| | | |
|---|---|---|
| DE | 102009000182 A1 | 7/2010 |
| EP | 0087077 A3 | 2/1983 |
| EP | 0261452 A2 | 3/1988 |
| JP | 63198851 A | 8/1988 |
| WO | 2014037395 A1 | 3/2014 |

OTHER PUBLICATIONS

Office Action issued in Chinese Application No. 201580077820.3 dated Jul. 24, 2019 (21 pages).
International Search Report and Written Opinion, PCT/EP2015/050527, dated Oct. 9, 2015, 11 pages.
International Preliminary Report on Patentability, PCT/EP2015/050527, dated May 2, 2017, 24 pages.

\* cited by examiner

METHOD FOR DETERMINING A PROPERTY OF A FLUID COMPONENT OF A FLUID PRESENT IN A COMPARTMENT OF AN ELECTRICAL APPARATUS

TECHNICAL FIELD

The invention relates to the field of medium and high voltage switching technologies and concerns a method for optically determining a property of a fluid component of a fluid present in a compartment of an electrical apparatus and a measurement device for carrying out the method, particularly for measuring a property of insulating gas and/or of an insulating gas component present in high voltage switchgear, according to the independent claims.

BACKGROUND

Electrical switching devices are well known in the field of medium and high voltage switching applications. They are e.g. used for interrupting a current when an electrical fault occurs. As an example, circuit breakers filled with a dielectric insulation fluid have the task of opening contacts and keeping them far apart from one another in order to avoid a current flow, even in case of high electrical potential originating from the electrical fault itself.

Dielectric insulating fluids are widely applied to insulate an electrically active part in a variety of electrical switching devices such as gas-insulated switchgear (GIS). For example, the electrically active part in medium or high voltage metal-encapsulated switchgear is arranged in a gas-tight compartment which encloses an insulation gas with a pressure of several bars, which electrically separates the compartment of the apparatus from its electrically active part. In other words, the insulation gas does not allow the flow of electrical current from the electrically active part to the compartment. A commonly used dielectric insulation gas is sulfur hexafluoride ($SF_6$) which exhibits excellent dielectric insulation. and electric are extinguishing capabilities. However, $SF_6$ is a strong contributor to the green-house effect and thus has a high global warming potential. Therefore, manufacturers of GIS have striven for alternative insulation fluids. Several alternative insulation fluids have been identified. Some of these alternatives comprise multi-component fluid mixtures, i.e. they comprise more than one molecular or atomic species. It is found that certain properties of such insulation fluid mixtures are compulsory to the safe operation of the electrical apparatus. As an example, the dielectric break-down strength of the insulation fluid is strongly dependent on local concentration ratios of the mixture fluid components and on total fluid pressure.

Among the proposed candidates for $SF_6$-replacement, the fluoroketones (FKs) with 5 or 6 carbon atoms (c5, c6) mixed with carrier gases appear to be most promising. FKs are reported to have good dielectric properties and contrary to $SF_6$, FKs only have a low inspect on global warming and are rapidly degraded in the atmosphere.

Since these insulation media comprise or consist of a mixture of gases, it is necessary to be able to determine the concentration of the various components, in particular that of the FK, in order to ensure safety and functionality of the electrical apparatus.

In addition to the concentration of gas components, there are a number of other relevant aspects and/or properties involved in the process of maintaining and monitoring an electrical switching device, e.g. monitoring humidity accumulation within the compartment, which may as well seriously affect functionality of such an electrical switching device.

In the following the invention will be described for gas insulated switchgear (GIS), which term will therefore be used in the general sense of electrical switching device.

DESCRIPTION OF THE INVENTION

It is an objective of the present invention to improve safety and maintenance capabilities of electrical switching devices with fluid insulation, particularly with gas insulation, and to simplify maintenance and monitoring of the insulation fluid properties.

This objective is solved by a method for determining a property of at least a fluid component of a fluid present in a compartment of an electrical apparatus and by a measurement device for carrying out the method, according to the features of the respective independent claims.

The method for determining a property of at least a fluid component of a fluid present in a compartment of an electrical apparatus by means of a measurement device arranged outside the compartment and comprising a chamber for receiving a quantity of the field from the compartment, comprises the steps or method elements of:

a) attaching the measurement device to a port of the compartment, b) optionally evacuating the chamber of the measurement device, (i.e. step b) may be left out)

c) illuminating an optical path in the chamber with light emitted by a light source, d) measuring a first intensity of light received by a light detector, e) releasing fluid from the compartment into the chamber, f) measuring a second intensity of light received by the light detector, g) calculating a partial particle density of the fluid component from the first and the second intensity, and either hi) determining the property of the fluid component by using the partial particle density; or h20) measuring at least one additional parameter of the fluid in the chamber and/or of a fluid portion in the optical path, and h21) determining the property of the fluid component by using the partial particle density and the at least one additional parameter.

It is noted that step b) of the method is preferred, however not necessary. This is due to the fact that this step, which reflects a reference measurement for obtaining the first intensity, may also be carried out in a gas that doesn't absorb light at any of the wavelengths of interest, e.g. argon. In this case the chamber must not necessarily be evacuated.

The measurement device for carrying out the method according to the invention comprises:

a casing surrounding the chamber for receiving the fluid from the compartment of the electrical apparatus, the light source for emitting light into the optical path, the light detector for receiving light emitted by the light source, at least: one connection element for connecting the measurement device to the port of the compartment of the electrical apparatus, a valve for controlling fluid transport into and out of the chamber, at leant a data acquisition and processing unit for acquiring and/or processing measured and/or detected data, and a controller.

The measurement device is preferably used for measuring a property of an insulating gas and/or of an insulating gas component present in a compartment of a high voltage switchgear.

In embodiments the measurement device is a partial density sensor and/or a hygrometer and/or a concentration sensor and/or dew point sensor and/or a partial pressure sensor.

In embodiments the measurement device measures contaminants and/or decomposition products of the fluid.

According to a preferred embodiment, the partial particle density of the fluid component is calculated by solving the equation:

$$Ix = I0 - e^{-k'px} \quad (1)$$

wherein I0 is the first intensity, Ix is the second intensity and k is a fluid-dependent and geometry-dependent coefficient. Particularly, k comprises an absorptivity of the fluid component and a length of the optical path and may be assumes to be constant for a given setup of the measurement device mounted to a GIS with a given fluid type. Thus, the GIS type is not relevant for the value of k, but the fluid present in the GIS is relevant for the value of k.

In embodiments a total density of the fluid in the chamber in measured as a said additional parameter by a density sensor.

In embodiments the property to be determined is a concentration of the fluid component in the fluid in percent by volume, calculated by:

$$cx = 100\% \cdot px/pO \quad (2)$$

wherein pO is the total particle density of the fluid in the chamber, px is the partial particle density of the fluid component and ox is the concentration of the fluid component in the fluid.

In embodiments a total pressure of the fluid in the chamber is measured as said additional parameter by means of a pressure sensor.

In embodiments a temperature of the fluid in the chamber is measured as said additional parameter by means of a temperature sensor.

In embodiments the property is derived using at least one equation of state of the fluid in the chamber. This equation of state may for example be the ideal gas; equation of state formulated is the following way:

$$p_0 \cdot v_0 = N_0 \cdot k_B \cdot T_0 \quad (3)$$

where $p_0$ is said total pressure of the fluid in the chamber with a volume VQ, NQ is the total particle number of the fluid in the chamber, $k_B$ in the Boltzmann constant and TQ is the absolute temperature of the fluid in the chamber, or in the following way:

$$p_0 = PO \cdot R_S \cdot T_0 \quad (4)$$

wherein $P_0$ is said total pressure of the fluid in the chamber, $P_0$ is said total particle density of the fluid in the chamber, $R_S$ is the specific gas constant and TQ is the temperature of the fluid in the chamber.

It is however preferred to use one of the following equations of state, which yield more accurate results.

One of these equations of state is the van der Waals equation of state or real gases;

$$p_0 = \frac{R - T_0}{V_m - b} - \frac{a}{V_m^2} \quad (5)$$

wherein $P_0$ is said total pressure of the fluid in the chamber, R is the universal gas constant, TQ is the temperature of the fluid in the chamber, $V_m$ is the molar volume of the fluid component (real gas), a is the cohesion pressure of the fluid component and b is the volume excluded by a mole of particles of the fluid component.

The other equation of state is the Peng-Robinson equation of state for real gases:

$$p_0 = \frac{R \cdot T_0}{V_m - b} - \frac{a \cdot \alpha}{V_m^2 + 2bV_m - b^2} \quad (6)$$

wherein $p_0$ is said total pressure of the fluid in the chamber, R is the universal gas constant, $T_Q$ is the temperature of the fluid in the chamber, $V_m$ is the molar volume of the fluid component (real gas), a is the cohesion pressure of the fluid component, b is the volume excluded by a mole of particles of the fluid component and a is a factor depending on an acentric factor and a reduced temperature.

Other equations of state for real gases may also be used, as the case may be.

Consequently it is possible to measure one or more of the above parameters, like the total pressure $p_0$, the temperature $T_0$, etc. and subsequently derive the unknown parameters from the above equations.

It is noted that besides the concentration other properties may also be derived, e.g. dew point or temperature-normalized partial pressure. For the dew point, the total pressure $P_0$ or the temperature $T_0$ are measured as an additional parameter in order to derive said dew point from px. For the temperature normalized partial pressure, the temperature $T_0$ is measured as an additional parameter.

Furthermore, the fluid property determined from px, p and T may also be the partial pressure of the fluid component, the temperature-normalized partial pressure of the fluid component, the partial mass density of the fluid component (kg/m') or a ratio of the fluid component particle number to the particle number of another gas component (e.g. decomposition product, or carrier gas component). The measurement method can also be used in a calibration process for determining the parameter k.

In embodiments the fluid component is chosen from the group consisting of: water, C5, CF4, HF, hexafluoropropene, heptafluoropropane, carbonyl fluoride, carbon dioxide and oxygen. However, the above calculations or measurements, respectively, may also be used to determine properties of other gases like $SF_6$ or the like.

In embodiments a lookup table is created once in a memory of the measurement device by carrying out steps a) to g) of the method repeatedly for different temperatures TO in the chamber. For example, dependencies of the first intensity I0 and the second intensity Ix on partial particle densities or number of particles Nx may be stored in this way for different temperatures. For subsequent measurements it is then possible to carry out step hi) or h20) and h21) of the method by deriving the property of the fluid component from the lookup table and a temperature measurement.

It is noted that this procedure of using a lookup table may either be carried out as a main working method or it may be used alternatively to the regular procedure described above in connection with the fluid concentration and the equations of state, as means for comparing results of the two methods and either averaging a final result from them or confirming accuracy of said regular measurement.

In embodiments steps f), g), hi) or f), g) h20), h21) of the method are repeated a predefined number of times and the property is averaged from all results of step hi) or h21, respectively.

Preferably, after determining the property of the fluid component either a step k1) of closing a connection between the compartment and the chamber and subsequently evacuating the fluid from the chamber, or k2) of pumping the fluid from the chamber back into the compartment and closing the connection between the compartment and the chamber, is carried out.

In case of step k1 the fluid is preferably evacuated into a fluid bag and subsequently disposed of properly in order to avoid environment contamination.

The measurement device preferably presents both options, such, that the user may choose either alternative, e.g. depending on the measured total pressure of fluid in the chamber. In embodiments, the total pressure of fluid in the chamber substantially equals the pressure of fluid in the compartment of the GIS. In other embodiments if may be advantageous to connect the measurement device to the GIS via a pressure reducer and therefore to fill the chamber with fluid only up to a predefined pressure which is lower than the pressure in the GIS. This is particularly advantageous if the chamber of the measurement device is not designed as pressure chamber end is therefore not capable of withstanding pressures of around 7 bar. In case of step k1) the pressure in the compartment would decrease due to the extraction of the portion of gas present in the measurement chamber. It may therefore be desirable to rather reinsert this portion into the compartment in order not to alter the pressure value therein. However, in most cases the pressure drop is negligible, as the volume of the measurement chamber is comparatively low, as will become apparent in connection with the length of the optical path required for the measurement method according to the invention, which will be described in connection with exemplary embodiments of the invention.

The present invention exhibits a number of advantages. It enables determination of properties of the insulation fluid present in a compartment of an electrical switching device in a simple and effective way, as the measurement device has the capability to be used on the outside of the electrical switching device and is only connected to said device when a measurement is due. Because of the resulting non-continuous measurement solution no material incompatibility problems of the device with the fluid arise. Furthermore the present solution has a low complexity, as e.g. no optical fibers and no reference channel are necessary. In turn, this advantage leads to an improved portability and lower manufacturing costs for the measurement device.

Thus, for field service and commissioning of GIS, the present solution makes it possible to access rapidly and easily the gas composition in the GIS-compartments. Service personnel is able to efficiently perform the following key procedures in the field:

Verification of gas composition (preferably including impurities) after compartment filling.

Determination of gas composition in compartments during scheduled service.

Determination of gas composition upon demand, e.g. when significant decomposition is suspected.

SHORT DESCRIPTION OF THE DRAWINGS

Figure 2:
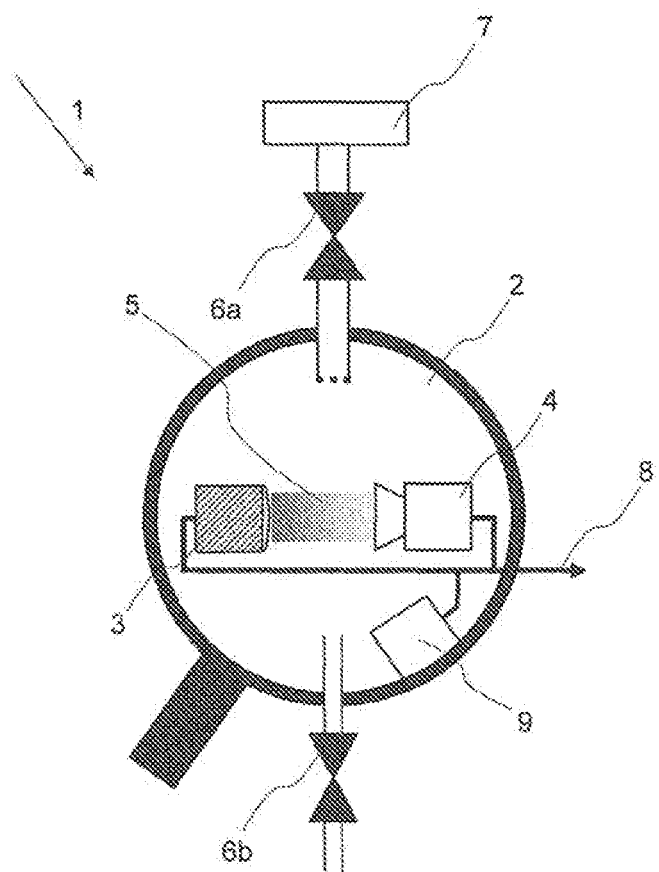
Figure 3:
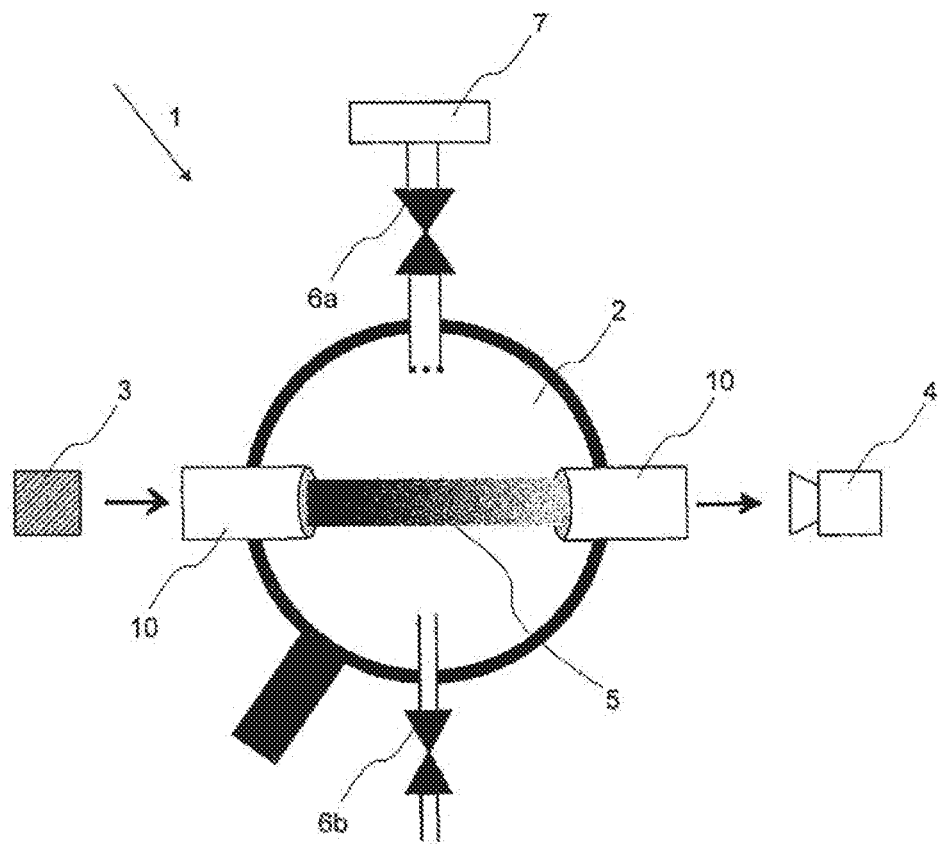
Figure 4:
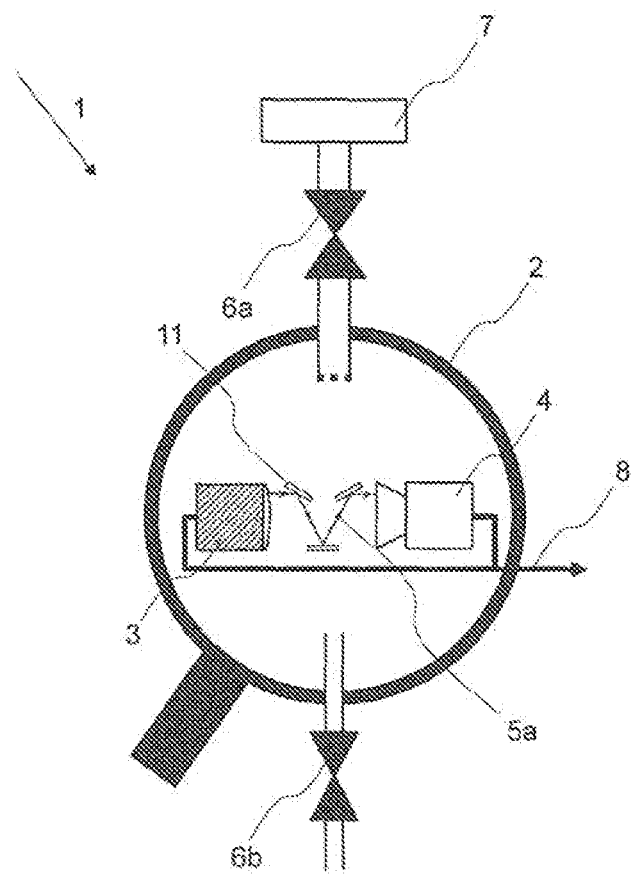
Figure 5:
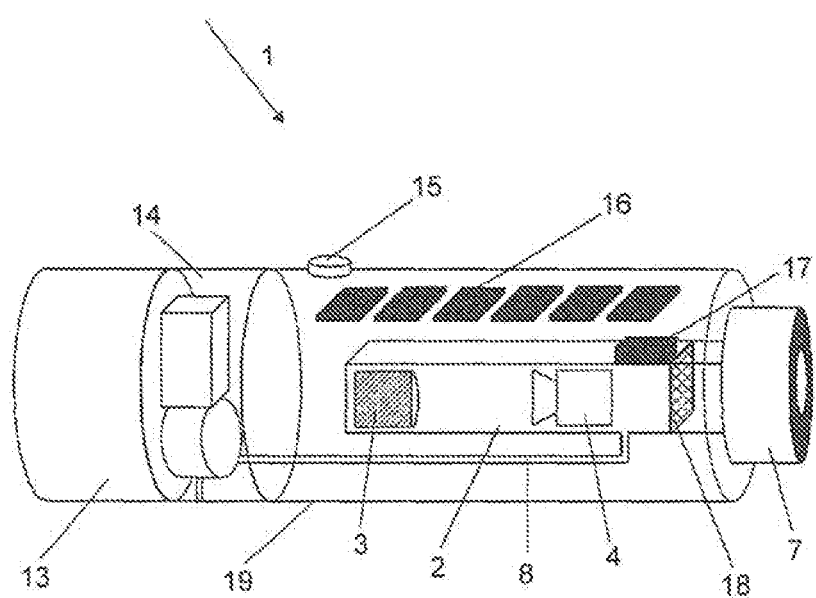

Embodiments, advantages and applications of the invention result from the dependent claims and from the now following description by means of the figures. It is shown in:

FIG. 1 a sectional view of a first embodiment of a measurement device according to the invention;

FIG. 2 a sectional view of a second embodiment of a measurement device according to the invention;

FIG. 3 a sectional view of a third embodiment of a measurement device according to the invention;

FIG. 4 a sectional view of a fourth embodiment of a measurement device according to the invention; and FIG. 5 a perspective view of a measurement device with additional elements.

WAYS OF CARRYING OUT THE INVENTION

The description of the invention doesn't encompass the electric apparatus (GIS) itself, as the numerous embodiments at the latter are well known and do not play a role for this description. Thus, the principles described in the following apply for usage of the invention in various switching devices, e.g. of the type mentioned at the beginning.

In the following same reference numerals denote structurally or functionally same or similar elements of the various embodiments of the invention. For the purposes of this disclosure the fluid used in the encapsulated or non-encapsulated electric apparatus can be $SF_6$ gas or any other dielectric insulation medium, may it be gaseous and/or liquid, and in particular can be a dielectric insulation gas or arc quenching gas. Such dielectric insulation medium can for example encompass media comprising an organofluorine compound, such organofluorine compound being selected from the group consisting of: a fluoroether, an oxitane, a fluoroamine, a fluoroketone, a fluoroolefin, a fluoronitrile, and mixtures and/or decomposition products thereof. Herein, the terms "fluoroether", "oxirane", "fluoroamine", "fluoroketone", "fluoroolefin" and "fluoronitrile" refer to at least partially fluorinated compounds. In particular, the term "fluoroether" encompasses both fluoropolyethers (e.g. galden) and fluoromonoethers as well as both hydrofluoroethers and perfluoroethers, the term "oxirane" encompasses both hydrofluorooxiranes and perfluorooxiranes, the term "fluoroamine" encompasses both hydrofluoroamines and perfluoroamines, the term "fluoroketone" encompasses both hydrofluoroketones and perfluoroketones, the term "fluoroolefin" encompasses both hydrofluoroolefins and perfluoroolefins, and the term "fluoronitrile" encompasses both hydro-fluoronitriles and perfluoronitriles. It can thereby be preferred that the fluoroether, the oxirane, the fluoroamine, the fluoroketone and the fluoronitrile are fully fluorinated, i.e. perfluorinated.

In embodiments, the dielectric insulation medium is selected from the group consisting of: a (or several) hydrofluoroether(s), a (or several) perfluoroketone (a), a (or several) hydrofluoroolefin(s), a (or several) perfluoronitrile(s), and mixtures thereof.

FIG. 1 shows a sectional view of a first embodiment of a measurement device 1 according to the invention. In this figures, as well as in the FIGS. 2 to 4, no casing of the measurement device 1 is shown. The casing is (shown in FIG. 5) contains a chamber 2 for receiving the fluid from the compartment of the GIS (not shown). Inside the measurement chamber a light source 3 for emitting light along an optical path 5 is provided. The light emitted by the light source 3 is received and detected by a light detector 4.

Furthermore, the measurement device 1 comprises a connection element 7 for connecting the measurement device to a port of the compartment of the GIS. A valve 6a is provided for controlling fluid transport from the compartment into the chamber and vice versa. The valve 6a is preferably adapted to open automatically as soon as the connection between the measurement device 1 and the compartment is established and/or to close automatically as soon as the measurement device 1 has been detached from the compartment. In this embodiment of the measurement device 1 it is possible to select between steps k1) on k2) described above in connection with gas evacuation from the chamber 2, after a completed measurement. This is by providing a second valve 6b which can be used for alternatively evacuating the field into a fluid bag. In another embodiment it is also possible to use a three way valve as the valve 6a, which is capable of selecting the desired output either back into the compartment or into a fluid bag. Preferably, the connection element 7 is adapted for direct flange-mounting. In other words, the connection element 7 may be attached to the port of the compartment in a gas-tight way, e.g. by a bayonet look, and may preferably enable at the same time an opening of the valve 6a, such that fluid from the compartment can flow into the chamber 2. Analogously, valve 6a can automatically be closed as soon as the connection element 7 is withdrawn from the port. Advantageously, this simplifies preparations for measurements by combining two steps into a single one.

The measurement device 1 further comprises at least a data acquisition and processing unit 16 for acquiring and/or processing measured and/or detected data and a controller. These units are shown in FIG. 5 and referenced generally by the numeral 16 which stands for the entire electronic circuitry of the measurement device 1 and also encompasses a memory, which is e.g. used to store intermediate calculated values and/or the lookup table mentioned above. Said unit and controller 16 are connected to the light source 3 and the detector 4 via a data and control bus 8. The main task of the data acquisition and processing unit 16 is to fetch data from the detector 4 and process it. The controller 16, e.g. a microcontroller, is capable of performing all necessary equations used for determining the property of the field component. The controller 16 has the task of triggering a measurement by switching on the light source 3 and activating the detector 4. It may also be used for translating user interface commands into corresponding actions, e.g. resetting the measurement device 1 upon user request or switching between a humidity measurement (described later) and an optical measurement.

Preferable, a length of the optical path 5 between the light source 3 and the detector 4 is chosen in the range of a 5 mm to 30 mm, more preferably 10 mm to 20 mm. It is therefore obvious that the dimensions of the chamber 2 are kept relatively small. This not only improves portability of the measurement device 1, but also allows a faster pressure equalization between the compartment and the chamber 2. Furthermore, the fluid quantity extracted from the electrical apparatus is very small, so it may be disposed of without affecting too much the pressure in the compartment. It is understood that other lengths of the optical paths 5 may also be used. Such an example will be described in connection with the embodiments of FIG. 3 and 4. In FIGS. 1 to 3 the optical path is shown in a gradation of grey for illustrating the decreasing light intensity from the light source 3 towards the detector 4.

Preferably, the light source 3 is adapted to emit light in an ultraviolet spectrum comprising a wave length between 240 nm and 380 nm. A wavelength of 300 nm is preferred for electrical apparatuses using C5 gas as insulating fluid, as this gas has its absorbance peak at this wavelength. Preferably, LEDs are used as light sources for all embodiments of the invention. They have the advantage of being small and of having only a negligible influence on the overall temperature TQ inside the chamber 2. It is furthermore preferred to use LEDs with an as narrow as possible spectrum of emitted light, as this has a positive effect on the accuracy of measurements. Currently, LEDs with the narrowest light spectrum on the market are provided by the company SETI, USA. In embodiment the light source is adapted to be operated continuously. However the measurement device may encompass a modulation module for switching between a continuous and a pulsed operating mode of the light source, wherein the operating mode is preferably user selectable. It is noted that the data acquisition and processing unit 16 also preferably comprises the entire driver electronics including the modulation module for the light source 3.

It is noted that the light source 5 may operate in another wavelength spectrum which may be more appropriate for other fluid components of the fluid used in the GIS. For this purpose, the light source 3 is mounted in such a way that it may be replaced with another source.

FIG. 2 shows a sectional view of a second embodiment of a measurement device 1 according to the invention. This embodiment differs from the first embodiment only in that it additionally comprises a humidity sensor 9 which is capable of measuring a total humidity as the additional parameter and, by using that value, of determining an actual humidity. The humidity sensor 9 is controlled by the controller and is connected to the control and data bus 9. The humidity sensor 9 may be a membrane humidity sensor 9 based on a capacitive or resistive measurement principle. Depending on the type of humidity sensor 9 used, it may be necessary to correct the result depending on the fluid component present in the chamber 2, as the humidity sensor 9 may exhibit a cross-sensitivity for said fluid component. For example, if C5 gas is used, some humidity sectors 9, e.g. those using a ceramic plate in connection with a capacitive measurement (e.g., manufactured by Vaisala, Finland or Rotronic, Switzerland) may yield erroneous values, as the ceramic plate not only absorbs humidity but also C5, thereby falsifying the end result. In this case the procedure described in the following may be used. Accordingly, the actual humidity is determined by the humidity sensor 9 according to the steps of:

i1) measuring at least once a virtual humidity caused by an influence of the fluid component, e.g. C5 gas, on the humidity sensor 9 by subjecting the humidity sensor 9 to an atmosphere of the fluid component at a known water concentration, preferably in absence of water, i2) measuring at least once a total humidity of the fluid in the chamber 2 as an additional parameter, and i3) deriving the actual humidity from the a priori, known virtual humidity and the additional parameter "total humidity".

Step i1) may comprise a set of measurements, i.e. generating a plot of C5 partial pressures vs. virtual humidity readings. This function is then used to determine the humidity offset of a measurement conducted is step i2) and to correct that measurement, yielding a correct humidity reading.

Step i3) normally comprises a correction as a function of temperature. In best-case scenarios it may however consist of a simple subtraction of the previously determined virtual humidity, i.e. when the humidity sensor's cross-sensitivity s temperature-independent.

In this embodiment the humidity sensor may be used in combination with the already described concentration determination of the fluid component for deriving the humidity as an additional parameter. For example, its result may be used in the concentration determination of the fluid component to such extent, that a more accurate result of said concentration is sought by taking into account the concentration of water in the fluid. However, as humidity may be negligible in some cases, this option is preferably user-selectable.

In other embodiments, it may be the humidity itself which is examined, i.e. the fluid component is in this case water as a component of the fluid. Consequently, the H2O-concentration is the property to be determined. In this case the light source 3 is adapted to emit light in an infrared spectrum comprising a wavelength between 720 nm and 4 μm, particularly a wavelength of substantially 750 nm, preferably a wavelength in a range of 1350 nm-1450 nm or 1850 nm-1950 nm, as this is the wavelength spectrum comprising absorbing wavelengths for water. The determination of concentration follows the same steps described above in connection with an insulating gas as fluid component. However, for this type of measurement it is preferable to use an optical bandpass or highpass filter (not shown) arranged in the optical path 5. This filter is chosen to be transparent only for the wavelengths of interest and helps limiting even more the wavelength spectrum of the light source 3. The use of such a filter for optical humidity measurements is preferred, because many other types of components are absorbed in the infrared spectrum range than e.g. for C5 in the ultraviolet spectrum range.

For this type of measurement the humidity sensor (hygrometer) 9 may be used as a source of comparison for the humidity measured by the optical method. It is however not necessary to use the humidity sensor 9 in this case.

Another aspect of the optical humidity measurement is the fact that, as mentioned, humidity may be very low and consequently more difficult to detect. Hence, it may be preferred to use a larger optical path 5 for such a measurement in order to increase the number of water molecules present in the optical path, with the aim of reaching an increased light absorbance which is easier detectable. The choice of path length 5 depends in this case also on the sensitivity of the detector 4 and on how narrow the wavelength spectrum of emitted light from the light source 3 can be made. The third and the fourth embodiment described in the following address this aspect of increasing length of the optical path 5.

It is noted that the length of the optical path 5 is not necessary a limitation of the optical humidity measurement, especially in connection with the hygrometer 9. Furthermore, the hygrometer 9 stay also be used in the third and fourth embodiment.

FIG. 3 shows a sectional view of a third embodiment of a measurement device 1 according to the invention. In this embodiment the light source 3 and the detector 4 are arranged outside the chamber 2. Two optical feedthrough elements 10 are arranged each in a fluid-tight manner in a wall of the chamber 2 in the optical path 5 between the light source 3 and the detector 4, in such a way that they enable light to travel from the light source 3 to the detector 4 through said wall or walls. One optical feedthrough element 10 can be sufficient when working in reflection.

In this way it is possible: to lengthen the optical path to a maximum. The limitation is substantially the width of the chamber 2. Depending on the intended application, i.e. what type of fluid component shall be examined, the chamber 2 may be designed according to this aspect. It may for example be advantageous to design the chamber as wide as possible if contaminants or decomposition products are a primary examination target for the measurement device 1. Some of these substances may only be present in extremely small amounts, such that their detection based on absorbance spectra requires an as long as possible optical path 5.

Due to this aspect, the third embodiment has the advantage that it alloys a more accurate determination of the second intensity Ix of the fluid component. Another advantage is that it makes it easier to replace the light source 3 with a light source emitting in a different wavelength spectrum, if such a replacement is necessary.

FIG. 4 shows a sectional view of a fourth embodiment of a measurement device 1 according to the invention. This embodiment also addresses the increase of the light path 5, however by keeping the advantage of compactness of a measurement device 1 with the light source 3 and the detector 4 arranged inside the chamber 2. In this embodiment, the measurement device further comprises light deflecting elements 11 arranged in the optical path 5 in such a way, that light 5a emitted from the light source 3 is deflected multiple times, at least twice, before reaching the detector 4. In the shown example three deflecting elements 11 are shown and are arranged at predetermined angles with respect to the direct light path 5 from the light source 3 to the detector 4. As can be seen by the exemplary light beam 5a, the path of said beam 5a is considerably increased as compared to a direct line from light source 3 to detector 4, thereby also increasing accuracy of intensity detection.

FIG. 5 shows a perspective schematical view of a measurement device 1 with additional elements. The location of elements is chosen for explanatory reasons and may differ from the actual location in a real measurement device 1. In the following, only the additional elements are described and it shall be assumed that the previously described embodiments of the measurement device 1 are all compatible with these elements.

The measurement device 1 preferably comprises an independent power supply 13, like a rechargeable Lithium-Ion battery. This makes the measurement device 1 portable, which is particularly advantageous for in-situ measurements of already commissioned GIS.

Furthermore, a pump 14, preferably a micropump 14, is arranged inside the casing 19 of the measurement device 1. The pump 14 is responsible for pumping the fluid located inside the chamber 2 either into the compartment of the GIS or into a fluid bag via the valve 6a and/or 6b, as the case may be. Furthermore, the pump 14 may be used for the optional step b) of the method according to the invention to evacuate the contents of the chamber 2 prior to inlet of fluid from the compartment. It is understood that the pump 14 is dimensioned to be able to pump the fluid back into the compartment after a measurement, i.e. it is able to slightly overcome the total pressure $p_0$. Preferably, it shall also be switchable for operation as a vacuum pomp 14 for evacuation of the chamber 2 for said step b). It is noted that normally the fluid will flow from the compartment of the electrical apparatus into the chamber 2 of the measurement device 1 without the need of the pump 14, as the chamber 2 will normally have a much lower pressure than the compartment.

The measurement device 1 has a reset button 15 used to reset certain parameters of the electronic circuitry 16 comprising the data acquisition and processing unit, the controller and the memory. Furthermore, means for triggering a measurement or choosing certain operation modes previously described are provided.

Preferably, the connection element 7 is adapted to support, i.e. to hold mechanically, the entire measurement device 1 once it is connected to the compartment. Therefore the user need not hold the measurement device 1 during measurement. An inlet portion of fluid from the valve 6a (not shown) to the chamber 2 preferably contains a particle filter 18 for filtering dirt or dust, which may e.g. have accumulated on the connection port of the compartment and/or on the valve 6a and/or on the connection element 7.

The measurement, device 1 may further comprise a pressure sensor 17 and/or a temperature sensor and/or a density sensor and/or the humidity sensor 9, of which only the pressure sensor 17 is exemplarily shown in FIG. 5.

The measurement device 1 may furthermore comprise display elements for showing certain parameters like total pressure inside the chamber 2 or concentration cx of the fluid component after a measurement. The display element or elements may be touch screen elements allowing interaction of the electronic circuitry 16 with the user. Furthermore, the measurement device 1 may be equipped with an input/output part for connection to an external computer used to read out parameters, calibration values, lookup tables and to update programs of the microcontroller 16, etc.

The measure device 1 may be operated in a fully automated way, e.g. just by pressing a start button, whereafter all measurement steps are carried out automatically, or it may be configured by the user to operate according to certain user-selectable parameters. Depending on the field of use and test complexity, certain components may be excluded, or replaceable. Furthermore, test scenarios may be implemented a posteriori via thy user interface port.

The present invention provides an effective way of assessing an inner state of a GIS in terms of its insulating fluid and therefore provides information necessary for commissioning and maintenance of such electric apparatuses. The measurement device 1 according to the invention is flexible in terms of measurement possibilities, being capable of measuring properties of different fluid components of the fluid of a GIS. It is very compact due to its measurement principle, therefore easily portable, and is equipped with an autonomous power source, such that it is suitable for in-situ measurements.

While there are shown and described presently preferred embodiments of the invention, it is to be distinctly understood that the invention is not limited thereto but may otherwise variously be embodied and practised within the scope of the following claims. Therefore, terms like "preferred" or "in particular" or "particularly" or "advantageously" or "optional", etc., signify optional and exemplary embodiments only.

LIST OF REFERENCE NUMERALS

1=Measurement device
2=Chamber
3=Light source
4=Detector
5=Optical path
5a=Light beam
6a=First valve
6b=Second valve
7=Connection element, flange, mechanical holding structure
8=Data and control bus
9=Hygrometer
10=Light feedthrough element
11=Deflection element
13=Bower supply
14=Pump
15=Reset button
16=Electronic circuitry
17=Pressure sensor, partial pressure sensor
18=Particle filter
19=Casing

The invention claimed is:

1. A method for determining a property of at least a fluid component of a fluid present in a compartment of an electrical apparatus by means of a measurement device arranged outside the compartment and comprising a chamber for receiving a quantity of the fluid from the compartment, comprising the steps of:
   a) attaching the measurement device to a port of the compartment,
   c) illuminating an optical path in the chamber with light emitted by a light source,
   d) measuring a first intensity of light received by a light detector,
   e) releasing fluid from the compartment into the chamber,
   f) measuring a second intensity of light received by the light detector,
   g) calculating a partial particle density of the fluid component from the first and the second intensity, and either
   h1) determining the property of the fluid component by using the partial particle density; or
   h20) measuring at least one additional parameter of the fluid in the chamber and/or of a fluid portion in the optical path, and
   h21) determining the property of the fluid component by using the partial particle density (px) and the at least one additional parameter, wherein
   the fluid present in the compartment of the electrical apparatus is a dielectric gas which comprises a background gas and an organofluorine compound selected from the group consisting of: fluoroethers, fluoroketones, fluoroolefins, fluoronitriles, and mixtures and/or decomposition products thereof, and
   the measurement is done non-continuously such that no material incompatibility of the dielectric gas with the measurement device arises.

2. The method according to claim 1, wherein the partial particle density px of the fluid component is calculated by solving the equation:

$$Ix = I0 \cdot e^{-px}$$

wherein Ix is the second intensity, I0 is the first intensity, k is a fluid-dependent and geometry-dependent coefficient, wherein k comprises an absorptivity of the fluid component and a length of the optical path.

3. The method according to claim 1, wherein a total density of the fluid in the chamber is measured as the additional parameter or as an additional parameter by a density sensor.

4. The method according to claims 2, wherein the property is a concentration cx of the fluid component in the fluid in percent by volume, calculated by:

$$cx = 100\% \cdot px/p0$$

wherein p0 is the total particle density of the fluid in the chamber and px is the partial particle density of the fluid component.

5. The method according to claim 1, wherein a total pressure p0 of the fluid in the chamber is measured as the additional parameter or as an additional parameter by means of a pressure sensor.

6. The method according to claim 1, wherein a temperature T0 of the fluid in the chamber is measured as the additional parameter or as an additional parameter by means of a temperature sensor.

7. The method according to claim 1, wherein in deriving the property at least one equation of state of the fluid in the chamber, including the ideal gas equation of state or the van der Waals equation of state or the Peng-Robinson equation of state, is used.

8. The method according to claim 1, wherein a total humidity is determined as the additional or an additional parameter by a humidity sensor.

9. The method according to claim 8, wherein the actual humidity is determined by the humidity sensor according to the steps of:
   i1) measuring at least once a virtual humidity caused by an influence of the fluid component on the humidity sensor by subjecting the humidity sensor to at least one specific concentration of the fluid component, at a known water concentration, in absence of water,
   i2) measuring at least once a total humidity of the fluid in the chamber as an additional parameter, and
   i3) deriving the actual humidity from the virtual humidity and the total humidity.

10. The method according to claim 1, wherein the fluid component is chosen from the group consisting of: water, C5, CF4, HF, hexafluoropropene, heptafluoropropane, carbonyl fluoride, carbon dioxide, oxygen, and mixtures thereof.

11. The method according to claim 1, wherein a lookup table is created once in a memory of the measurement device by carrying out steps a) to g) of the method repeatedly for different temperatures (T0) in the chamber.

12. The method according to claim 11, wherein step h1) or h21) of the method are carried out by deriving the property of the fluid component from the lookup table.

13. The method according to claim 1, wherein a length of the optical path between the light source and the detector is chosen in the range of 5 mm to 30 mm.

14. The method according to claim 1, wherein steps f), g), h1) or f), g) h20), h21) of the method are repeated a predefined number of times and the property is averaged from all results of step h1) or h21), respectively.

15. The method according to claim 1, wherein after determining the property of the fluid component either a step
   k1) of closing a connection between the compartment and the chamber and subsequently evacuating the fluid from the chamber, or
   k2) of pumping the fluid from the chamber back into the compartment and closing the connection between the compartment and the chamber, is carried out.

16. The method according to claim 1, wherein the property is chosen to be one of: a dew point, a temperature-normalized partial pressure, a partial pressure of the fluid component, a temperature-normalized partial pressure of the fluid component, a partial mass density of the fluid component, a ratio of a fluid component particle number to a particle number of another gas component, and in particular a combination of such quantities.

17. The method according to claim 1, wherein the dielectric gas comprises an organofluorine compound selected from the group consisting of: hydrofluoro-monoethers, perfluoro-ketones, hydrofluoroolefins, perfluoro-nitriles, and mixtures and/or decomposition products thereof.

18. The method according to claim 1, wherein the fluid comprises a background gas, selected from the group consisting of: air, specifically synthetic air and/or technical air, an air component, specifically nitrogen and/or oxygen, carbon dioxide, a nitrogen oxide, and mixtures thereof.

19. The method according to claim 1, further comprising:
   a casing surrounding the chamber for receiving the fluid from the compartment of the electrical apparatus,
   at least one connection element for connecting the measurement device to the port of the compartment of the electrical apparatus,
   a valve for controlling fluid transport into and out of the chamber,
   at least a data acquisition and processing unit for acquiring and/or processing measured and/or detected data, and
   a controller, wherein
   the measurement device is used on the outside of the electrical apparatus and is only connected to the electrical apparatus when a measurement is due.

20. The method according to claim 19, wherein the light source is adapted to emit light in an ultraviolet spectrum comprising a wave length between 240 nm and 380 nm.

21. The method according to claim 19, wherein the light source is adapted to emit light in an infrared spectrum comprising a wave length between 720 nm and 4 μm.

22. The method according to claim 19, wherein the connection element is adapted for direct flange-mounting.

23. The method according to claim 19, wherein the valve is adapted to open automatically as soon as the connection between the measurement device and the compartment is established and/or to close automatically as soon as the measurement device has been detached from the compartment.

24. The method according to claim 19, further comprising an independent power supply, in particular the measurement device being hand-held.

25. The method according to claim 19, wherein the connection element is adapted to support the entire measurement device once it is connected to the compartment.

26. The method according to claim 19, further comprising at least one light deflecting element arranged in the optical path in such a way, that a path of light emitted from the light source is deflected at least twice before reaching the detector.

27. The method according to claim 19, further comprising at least one sensor selected from the group consisting of: pressure sensor, temperature sensor, density sensor, and humidity sensor, and combinations thereof.

28. The method according to claim 19, further comprising an additional valve for evacuating fluid contained in the chamber.

29. The method according to claim 19, further comprising a first pump for regulating inlet and outlet of fluid into the chamber or out of the chamber respectively.

30. The method according to claim 19, wherein an optical bandpass or highpass filter is arranged in the optical path.

31. The method according to claim 19, wherein the light source and the detector are arranged inside the chamber.

32. The method according to claim 19, wherein the light source and the detector are arranged outside the chamber and wherein one or two optical feedthrough elements is or are each arranged in a fluid-tight manner in a wall of the chamber in the optical path between the light source and the detector, in such a way that they enable light to travel from the light source to the detector through said wall or walls.

33. The method according to claim 19, wherein the connection element comprises a pressure reducer.

34. The method according to claim 19 wherein the property is a property of an insulating gas and/or of an insulating gas component present in a compartment of a high voltage switchgear, and the measurement device is a sensor selected from the group consisting of: partial density sensor, hygrometer, concentration sensor, dew point sensor, and partial pressure sensor, and combinations thereof.

35. The method according to claim 34, wherein the measurement device measures contaminants and/or decomposition products of the fluid.

36. The method according to claim 2 in a calibration process for determining the fluid-dependent and geometry-dependent coefficient k.

37. The method according to claim 1, further comprising:
b) evacuating the chamber of the measurement device.

* * * * *